(12) United States Patent
Soltis et al.

(10) Patent No.: US 8,162,581 B2
(45) Date of Patent: Apr. 24, 2012

(54) RELEASE PIN

(75) Inventors: Robert C. Soltis, Parkman, OH (US); James C. Klingenberg, Concord, OH (US); David Craig Hageman, Chagrin Falls, OH (US)

(73) Assignee: Jergens, Inc., Cleveland, OH (US)

( * ) Notice: Subject to any disclaimer, the term of this patent is extended or adjusted under 35 U.S.C. 154(b) by 0 days.

(21) Appl. No.: 12/836,173

(22) Filed: Jul. 14, 2010

(65) Prior Publication Data

US 2011/0008128 A1    Jan. 13, 2011

Related U.S. Application Data

(63) Continuation of application No. 11/479,662, filed on Jun. 30, 2006, now abandoned.

(60) Provisional application No. 60/696,412, filed on Jul. 1, 2005.

(51) Int. Cl.
*F16B 21/00* (2006.01)

(52) U.S. Cl. ........................................ 411/348; 411/347

(58) Field of Classification Search .................... 411/21, 411/347, 348, 351, 549, 552, 553, 555; 279/2.12
See application file for complete search history.

(56) References Cited

U.S. PATENT DOCUMENTS

| | | |
|---|---|---|
| 2,147,343 A | 2/1939 | Hokanson |
| 2,313,883 A | 3/1943 | Lowther |
| 2,353,851 A | 7/1944 | Rosan |
| 2,366,459 A * | 1/1945 | Rosa .............................. 313/238 |
| 2,373,083 A | 4/1945 | Brewster |
| 2,779,228 A | 1/1957 | Meepos et al. |
| 2,901,804 A | 9/1959 | Williams |
| 2,968,205 A | 1/1961 | Springate |
| 2,983,978 A | 5/1961 | Wilgus |
| 3,037,256 A | 6/1962 | Chapman |
| 3,046,629 A | 7/1962 | Malesko |
| 3,052,940 A | 9/1962 | Sellers |
| 3,068,737 A | 12/1962 | Mewse |
| 3,085,462 A | 4/1963 | Myers |
| 3,117,484 A | 1/1964 | Myers |
| 3,129,472 A | 4/1964 | Hensel |
| 3,145,441 A | 8/1964 | Strandrud |
| 3,180,390 A | 4/1965 | Ockert, Jr. |
| 3,215,023 A | 11/1965 | Becker |
| 3,233,496 A | 2/1966 | De Pew et al. |
| 3,243,837 A | 4/1966 | Smith |
| 3,276,799 A | 10/1966 | Moore et al. |
| 3,277,767 A | 10/1966 | Allen |

(Continued)

FOREIGN PATENT DOCUMENTS

GB    957177    5/1964

*Primary Examiner* — Victor Batson
*Assistant Examiner* — Roberta Delisle
(74) *Attorney, Agent, or Firm* — Rankin, Hill & Clark LLP

(57) ABSTRACT

A releasable locking member, having a handle, a spindle, and a shank connected at a first end to the handle. The shank has an opening extending through along a longitudinal axis thereof. A shaft extends through an opening of the shank. The shaft has a first portion, a second portion, and a central portion extending between the first and second portions. An actuator member is connected to the first portion of the shaft. A spindle is connected to the second portion of the shaft. A biasing member is positioned between the actuator member and a wall of the handle.

25 Claims, 3 Drawing Sheets

U.S. PATENT DOCUMENTS

| | | |
|---|---|---|
| 3,596,554 A | 8/1971 | Low |
| 3,891,182 A | 6/1975 | Schwerin |
| 4,085,763 A | 4/1978 | Thomas |
| 4,185,474 A | 1/1980 | Kulischenko |
| 4,433,854 A | 2/1984 | Smith |
| 4,913,610 A | 4/1990 | Olivieri |
| 4,988,248 A | 1/1991 | Flux |
| 5,027,624 A | 7/1991 | Agbay et al. |
| 5,207,544 A | 5/1993 | Yamamoto et al. |
| 5,340,255 A | 8/1994 | Duran |
| 5,394,594 A | 3/1995 | Duran |
| 5,494,323 A | 2/1996 | Huang |
| 5,741,022 A | 4/1998 | Wass et al. |
| 6,386,789 B1 | 5/2002 | Chausse et al. |
| 6,595,713 B1 | 7/2003 | Wilson |
| 6,722,711 B2 | 4/2004 | Kitzis |
| 6,786,669 B2 | 9/2004 | Tsui et al. |
| 6,884,013 B2 | 4/2005 | Kiviranta et al. |
| 6,893,184 B2 * | 5/2005 | Mills et al. .................. 403/322.2 |
| 7,574,768 B2 * | 8/2009 | Morris et al. .................... 15/145 |
| 7,731,465 B2 * | 6/2010 | Stapulionis et al. .......... 411/348 |
| 7,891,903 B2 * | 2/2011 | Klingenberg et al. ..... 403/322.2 |

* cited by examiner

RELEASE PIN

CLAIM OF PRIORITY

This application is a continuation of application Ser. No. 11/479,662 filed Jun. 30, 2006, which claims priority from provisional application Ser. No. 60/696,412 filed on Jul. 1, 2005, which is hereby incorporated by reference.

BACKGROUND

Releasable securing devices, such as ball pins, are commonly used for joining the parts of industrial fixtures releasably together. Such ball pins have a hollow, hardened stem inserted through mating bores in the parts to be joined, the stem terminating in an abutment surface to be pressed against the top side of the parts; and depressible or retractable ball detents near the tip of the pin, to engage the parts on their bottom side.

Quick connect ball locking devices generally include a plurality of detents, such as balls, trapped within a tube but protruding out openings therein. A ball actuator is reciprocal within the tube and movable from a first position wherein the balls are retracted substantially within the tube or moved outwardly a sufficient distance to lock the balls within a mating receptacle. An example of such a ball locking device is shown in U.S. Pat. No. 5,394,594 which is incorporated by reference herein.

One of the objects of the present invention is to improve such releasable securing devices by making their length adjustable, to assure a precise tight fit, and permit various strengths of materials to be used to withstand axial loads on the pins.

Referring in particular to FIG. 1, in previous fastener devices, a compression spring 1 is mounted within an enlarged bore 2 at one end of the pin shank 3 and this spring normally holds a shoulder 4 on the spindle 6 against an abutment 5 on the pin shank. In this position of the parts the land 7 hold the balls 8 in a projected position. An actuator button 9 on the shank may be moved manually to bring a groove 11 into registry with the balls and thereby permit radially inward movement of the balls to a release position.

A problem with these existing release pins is that the springs are captured within a bore of the pin shank and are not easily accessible from outside of the release pin. Thus it is difficult to change the size of the spring without also changing the cavity size of the pin. A spring being positioned outside of the cavity allows the release pin to be easily reloaded, and also increases the strength of the release pin.

Furthermore, existing release pins do not have a shaft design which allows for interchangeable shafts with different lengths and materials. Thus, there is a need for providing a capability for different shaft lengths and material types as well as various methods of securing the shaft to the release pin assembly.

Thus, it is desirable to develop a new and improved release pin with an interchangeable shaft which overcomes the above-mentioned deficiencies and others while providing advantageous overall results.

SUMMARY OF THE INVENTION

This invention relates to fastener devices and is particularly directed to quick release pin assemblies. Devices of this type employ a shaft having a spindle which is movable axially within a longitudinal bore in the shank of a pin. Movement of the spindle acts to cause radial movement of balls outward beyond the outer surface of the pin shank to form a projecting abutment. One or more land portions on the movable spindle holds the balls in a projected position, while a groove or ramp in the spindle permits the balls to be moved radially inwardly so that they do not project beyond the outer surface of the shank.

Release pins are commonly used as shear pins and typically pass through aligned apertures in adjacent plates. A stop surface at one end of the shank engages one of the plates and the balls when projected lie closely adjacent the remote surface of the other plate. Since it is desirable in many cases to restrict to a minimum axial movement of the pin with respect to the plates, existing release pin assemblies must be manufactured in a large number of effective lengths for each nominal diameter for the pin shank. Thus, pin assemblies must be available in a number of lengths measured from the stop surface on the pin shank to the position of the locking balls. This requirement necessitates the manufacture of pin shanks of various lengths, and up to the time of the present invention required a corresponding number of spindles of different lengths. Accordingly, it is another object of the present invention to provide pins of various lengths to accommodate various applications.

The release pin of the present invention has a handle attached to a shank. A shaft is mounted within the bore of the shank and has a button mounted at one end and a spindle mounted at an opposite end. A spring is mounted between the button and the handle and is positioned outside of the shank so that the spring can be easily removed and replaced.

The shaft has a first end and a second end which is secured to a main body of the shaft and can be made of various materials, such as heat treated high grade stainless steel. The ends of the shaft can be made of high grade steel to withstand axial loads placed on the opposite ends of the shaft.

In accordance with an aspect of the invention, a releasable locking member has a handle and a shank connected at a first end to the handle. The shank has an opening extending through along a longitudinal axis thereof. A shaft extends through the opening of the shank. The shaft has a first end portion, a second end portion, and a separate, interchangeable central portion extending between the two end portions. An actuator member is connected to a first end portion of the shaft. A spindle is connected to a second end portion of the shaft. A biasing member is positioned between the actuator member and a wall of the handle.

Another aspect of the invention is the provision of a pin shaft which has ends made of different materials than the shaft central portion.

Yet another aspect of the invention is the provision of a shaft having removable ends, wherein the central portion of the shaft can be replaced with different length shafts.

Other aspects of the present invention will become apparent to those of average skill in the art upon a reading and understanding of the following detailed description.

BRIEF DESCRIPTION OF THE DRAWINGS

Further aspects of the invention will become apparent by reference to the detailed description when considered in conjunction with the figures, wherein like reference numbers indicate like elements through the several views, and wherein.

DETAILED DESCRIPTION

Figure 2:
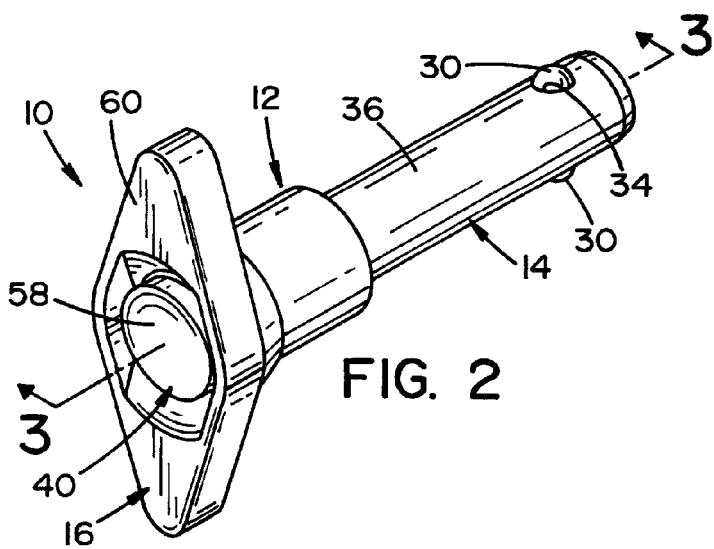
FIG. 2 is a perspective view of a release pin in accordance with an embodiment of the present invention.
Figure 4:
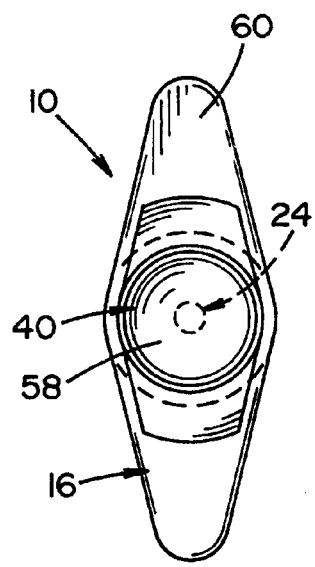
FIG. 4 is a front elevational view of the release pin of FIG. 2.
Figure 3:
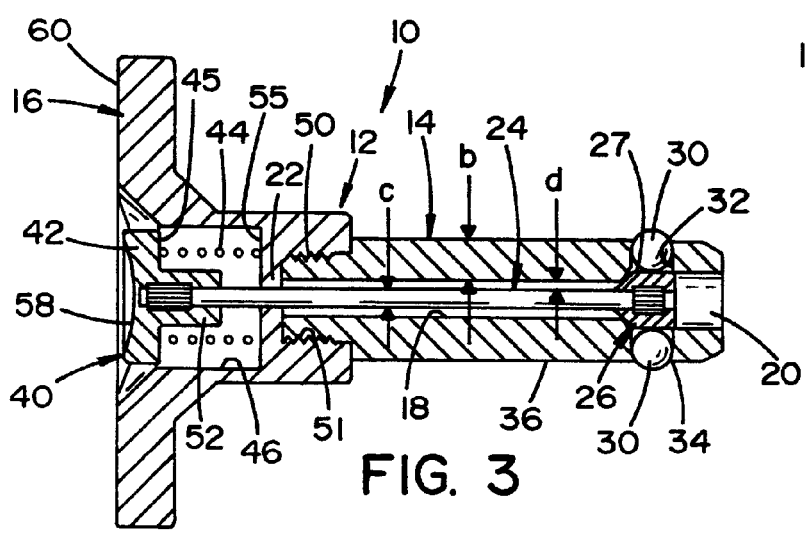
FIG. 3 is a cross-sectional view taken along line 3-3 in FIG. 2 shown in a locked position.
Figure 5:
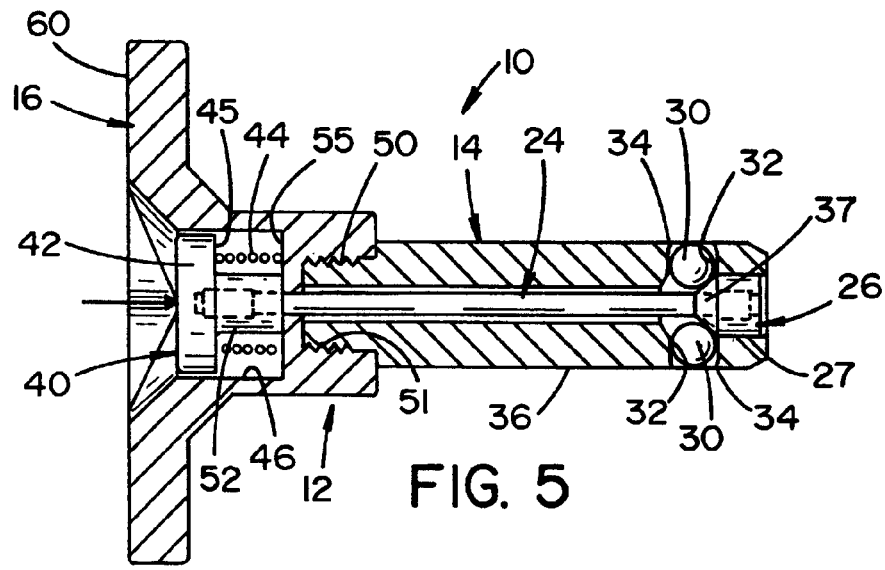
FIG. 5 is a side elevational view in cross-section of the release pin of FIG. 2 in an unlocked position.

Referring now to the drawings, in particular FIGS. 2 and 3, a quick release pin assembly 10 includes a pin member 12 having a shank 14 and a handle 16. The shank has a central axial bore 18 extending along a longitudinal axis of the shank and open at one end 20 and terminating at a shoulder 22. A shaft 24 is mounted within the bore 18 for axial sliding movement. A spindle 26 is mounted on an end portion of the shaft and constitutes a land or edge 27 which serves to hold a pair of radially movable balls 30 in their fully projected position. That is, the balls move radially in lateral bores 32 in shank 14. The outer ends of the bores 32 can be "staked" to reduce the size of the openings 34 which intersect the outer cylindrical surface 36 of the shank 14, and this reduced size opening retains each ball from laterally escaping. Referring to FIG. 5, the shaft 24 is moved further axially to bring the spindle out of alignment with the balls, allowing the balls 30 to move radially inwardly along a ramped edge 37 so that they fall into openings 34 and no longer extend beyond the outer surface 36 of the shank 14.

An actuator button or knob 40 is fixed to the shaft in a manner described below and the button has a flange 42 which is engaged by a compression spring 44 on an underside 45 of the flange mounted within the enlarged opening or bore 46 of the handle 16. One end of the spring 44 engages surface 55 of the handle and the other end engages underside 45 of the flange 42. The handle is secured to the shank by any convenient means such as, for example by press fit, brazing, swaging or screw threading. In the particular connection illustrated in the drawings, the shank and handle are connected by means of the threaded fit along the surfaces 50, 51.

Cylindrical portion 52 of the actuator knob abuts surface 55 of the handle bore 46 when the knob is depressed as shown in FIG. 5. When an exposed end surface 58 of the actuator knob is manually depressed to compress the spring 44, the "land" portion 27 of the spindle moves along the central axial bore 18 and away from the position of the balls and allows the balls to drop into engagement with the ramped portions 37 of the spindle. This is the unlocked position of the release pin.

Laterally extending walls 60 of the handle 16 can be of various shapes or designs to provide a surface for engagement by fingers of the operator.

Figure 6:
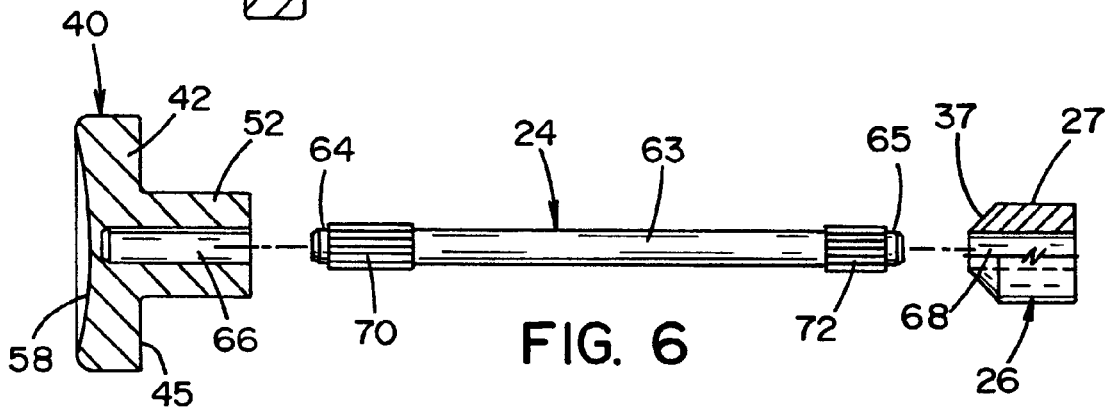
FIG. 6 is a side elevational view in partial cross section of a release pin in a disassembled configuration illustrating the handle, shaft and spindle in accordance with another embodiment of the present invention.
Figure 7:
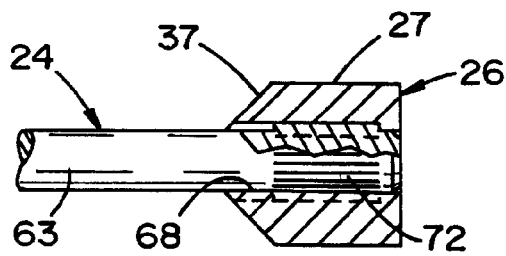
FIG. 7 is a side elevational view illustrating the connection of a shaft and a spindle in accordance with another embodiment of the present invention.

In accordance with the present invention, the shaft 24 has a central portion 63 formed of solid cylindrical material and a first end portion 64 is received within a bore 66 in the actuator button 40. A second end portion 65 of the shaft is received within a bore 68 of the spindle 26. Referring to FIGS. 6 and 7, ends 64, 65 each has a separate, knurled portion 70, 72 which causes a friction or press fit between the shaft and the bores 66 and 68 of the button 40 and spindle 26, respectively, to secure the shaft to the button 40 and spindle 26. The end portions 70, 72 can be fabricated from various materials, such as heat treated high grade stainless steel, which is often used in military applications. By having separate end portions 70 and 72 mounted to central portion 63 of the shaft, the ends can be made of different material than the overall shaft; thus reducing costs. Furthermore, various lengths of shafts can be easily used by replacing the interchangeable central portions of the shaft with different length or different material central portions.

Figure 16:
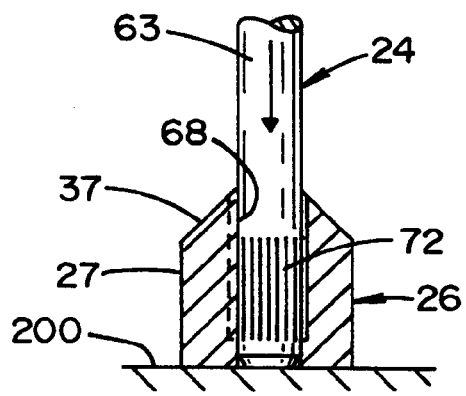
FIG. 16 is a side elevational view in partial cross-section illustrating installation of a shaft end into a spindle.
Figure 17:
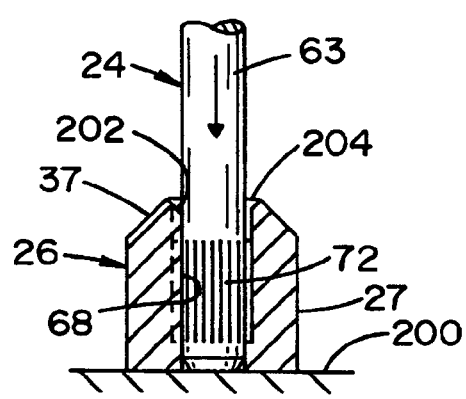
FIG. 17 is a side elevational view in partial cross-section illustrating installation of a shaft end into a spindle having a cam.

Referring to FIGS. 16 and 17, to align and install the knurled end portion 72 into spindle bore 68, the spindle 26 may be placed on a support surface 200. The shaft 24 is pushed downwardly until portion 72 is fully inserted into bore 68. Referring to FIG. 17, a cam guide 202 can be provided on outer edge 204 of the spindle to facilitate insertion of the shaft.

Portions 70 and 72 can be made of a variety of materials, such as heat treated hardened high grade stainless steel as required for certain military applications. Separate end portions can be provided on end portions of the shaft to be attached onto the shaft to withstand axial shear loads at the ends of the shaft. Referring to FIG. 3, loads found on shank 14 through its thickness b may be transformed to shaft 24 through its thickness c if axial movement of the shank occurs through dimension d.

After inserting the end of the shaft into the bore of the actuator button a swaging tool (not shown) is brought into engagement with a portion of the actuator button to permanently attach the actuator button to the shaft.

Figure 1:
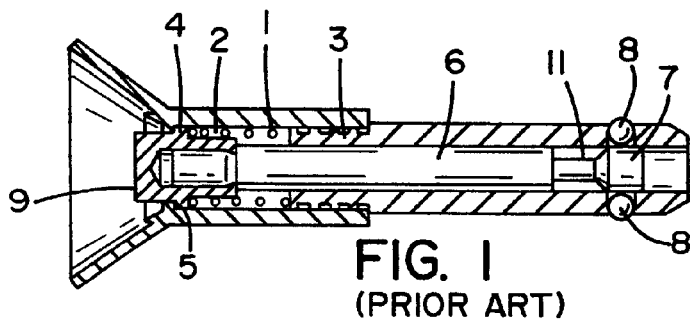
FIG. 1 is a side elevational view in cross-section of an existing release pin.

The shaft, actuator button, balls, spring and spindle are then assembled with respect to the handle 16 in the manner shown in FIG. 3. The surfaces 50, 51 are connected together to form a permanent connection between the handle and the shank. Spring 44 is positioned within a cavity of the handle so that the spring can be replaced by other springs or various lengths and strengths. Since the spring is not actually enclosed in a bore of the handle as shown in the prior art of FIG. 1, it is easily removable without disassembly of the entire pin structure.

Figure 8:
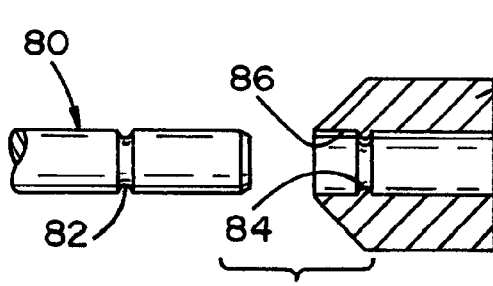
FIG. 8 is a side elevational view of a shaft and spindle in a detached configuration in accordance with another embodiment of the present invention.
Figure 9:
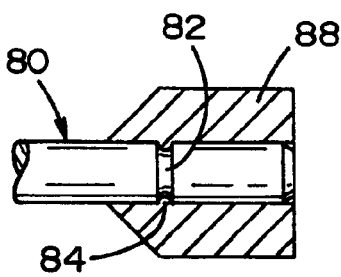
FIG. 9 is a side elevational view of the shaft and spindle of FIG. 8 in an attached configuration.

Referring now to FIGS. 8 and 9, an alternate method of securing the spindle to the shaft is shown. Shaft 80 has a grooved section 82 which selectively receives a detent portion 84 in a bore 86 of a spindle 88. As the shaft is inserted into the bore, the detents flex or move so that the diameter of the shaft may move axially within the bore.

Figure 10:
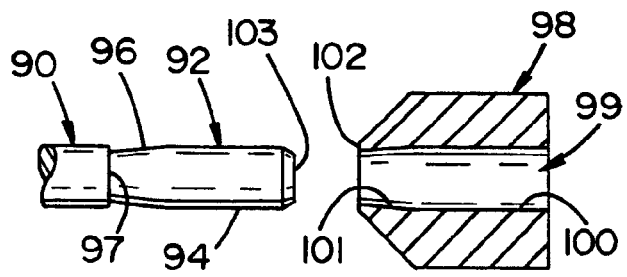
FIG. 10 is a side elevational view of a shaft and spindle in a detached configuration in accordance with another embodiment of the present invention.
Figure 11:
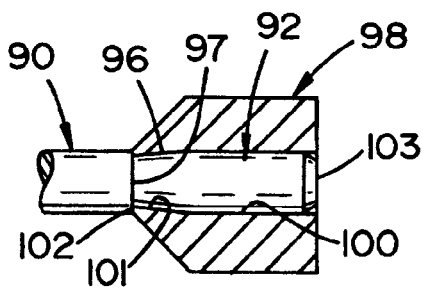
FIG. 11 is a side elevational view of the shaft and spindle of FIG. 10 in an attached configuration.

Referring to FIGS. 10 and 11, another alternative embodiment is shown. In the embodiment, a shaft 90 has an end portion 92 with a straight section 94 and a tapered or angled section 96. A shoulder 97 is formed at an edge between the straight section 94 and the angled section 96. A spindle 98 has a bore 99 also with a straight section 100 and an angled or tapered section 101 which extends to an outer edge 102 of the spindle. The shaft is inserted into the spindle until the shoulder 97 abuts the edge 102 of the spindle. The outer edge 102 of the spindle flexes slightly to accommodate an end 103 of the shaft and help retain the shaft within the spindle bore.

Figure 12:
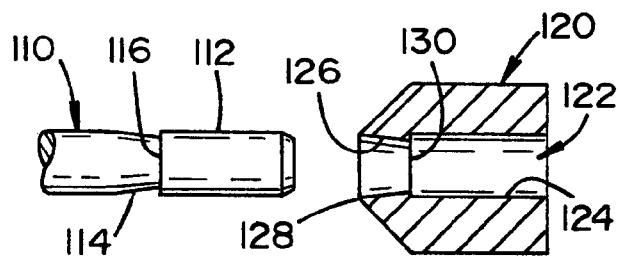
FIG. 12 is a side elevational view of a shaft and spindle in a detached configuration in accordance with another embodiment of the present invention.
Figure 13:
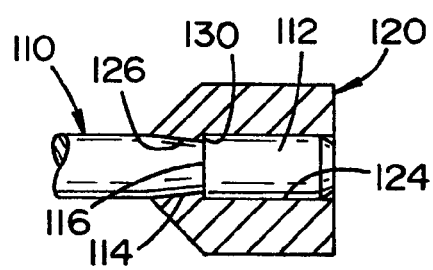
FIG. 13 is a side elevational view of the shaft and spindle of FIG. 12 in an attached configuration.

Referring now to FIGS. 12 and 13, yet another embodiment of the shaft and spindle arrangement is shown. In this embodiment, a shaft 110 has a straight edge portion 112 at an end of the shaft and a tapered wall portion 114 which abuts the straight portion. A shoulder 116 is formed between the straight portion and the tapered portion. A spindle 120 has a central axial bore 122 therethrough having two portions, a straight portion 124 and a tapered wall portion 126. The tapered wall portion is positioned adjacent an outer edge 128 of the spindle. A ledge 130 is formed between the walls of the tapered portion and the walls of the straight portion. When the shaft is inserted into the bore of the spindle, the straight portion 112 of the shaft extends into the bore until the shoulder 116 of the end of the shaft is able to flex slightly to enable the shoulder 116 to move past the ledge 130 and then snap into place and abut the ledge so that the shaft cannot be pulled out of the spindle once the shoulder engages the ledge (see FIG. 13).

Figure 14:
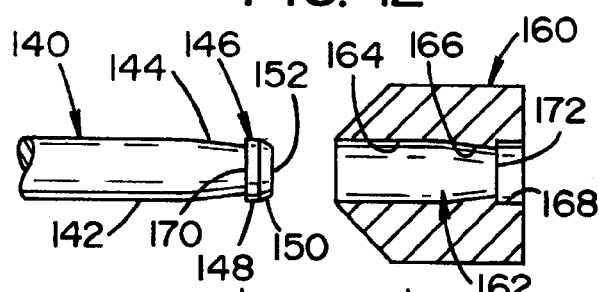
FIG. 14 is a side elevational view of a shaft and spindle in a detached configuration in accordance with another embodiment of the present invention.
Figure 15:
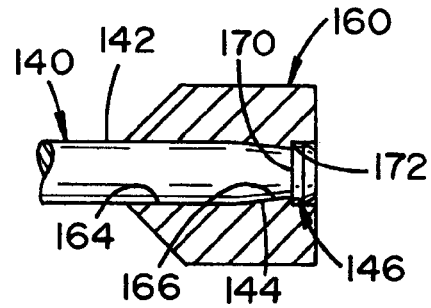
FIG. 15 is a side elevational view of the shaft and spindle of FIG. 14 in an attached configuration.

Referring now to FIGS. 14 and 15, another embodiment of the shaft and spindle interface is shown. Shaft 140 has an end portion having a straight portion 142, and a tapered wall portion 144. An end section 146 of the shaft has a straight portion 148 substantially the same diameter as the straight portion 142. A tapered portion 150 is formed adjacent straight portion 148 and terminates at a flat wall 152 of the end section 146.

A spindle 160 has a central axial bore 162 having a first straight portion 164, a tapered wall portion 166, and a second straight portion 168. Portions 164 and 168 have substantially the same diameter. Portion 168 has an axial length sufficient to accommodate the end section 146 of the shaft.

Shaft 140 is inserted into axial bore 162 of the spindle 160 until end section 146 engages straight portion 168. Then, a shoulder 170 on end section 146 formed between straight portion 148 and tapered section 144 engages a ledge 172 formed between straight portion 168 and tapered portion 166 of spindle 160 (see FIG. 15). This engagement prevents the shaft from being pulled out of the spindle.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A releasable locking member, comprising:
   a handle;
   a shank connected at a first end to the handle, wherein the shank has an axial bore extending through the shank along a longitudinal axis thereof and a lateral opening;
   a multi-component shaft assembly having a shaft and a separate spindle component, the shaft extending through the bore of the shank, wherein the shaft has a first end portion, a second end portion, and a central portion extending between the first and second end portions, the spindle having a proximal end facing the shaft and a distal end opposite the proximal end, the spindle further including a bore extending from the proximal end toward the distal end, the bore being shaped to receive the second end portion of the shaft to securely connect the separate spindle to the second end portion of the shaft;
   an actuator member connected to the first end portion of the shaft;
   a ball received in the lateral opening in the shank; and
   a biasing member positioned between the actuator member and a wall of the handle, wherein the biasing member biases the shaft such that the spindle cooperates with the ball such that the ball projects beyond an outer surface the shank.

2. The releasable locking member of claim 1, wherein the spindle further includes cylindrical land portion and a conical ramped portion, wherein the cylindrical land portion of the spindle contacts the ball to place the ball in a projected position where a portion of the ball extends beyond an outer surface of the shank.

3. The releasable locking member of claim 2, wherein the conical ramped portion angles toward the first end portion of the shaft and the longitudinal axis.

4. The releasable locking member of claim 3, wherein the cylindrical land portion extends from the distal end to the conical ramped portion and the conical ramped portion extends from the cylindrical land portion to the proximal end.

5. The releasable locking member of claim 1, wherein the second end portion of the shaft is knurled and is received in the bore of the spindle to connect the spindle with the shaft.

6. The releasable locking member of claim 5, wherein the shaft has a generally constant cross-sectional configuration between the proximal end of the spindle and the actuator member.

7. The releasable locking member of claim 6, wherein the shank includes a second end opposite the first end and the axial bore having a narrow section sized for the passage of the shaft and a counterbore extending from the second end toward the first end past the lateral opening such that the lateral openings extend into the counterbore, the region between the counterbore and the narrow section of the axial bore including a conical face, the counterbore being sized to receive the separate spindle and the conical face limiting axial movement of the spindle which thereby limits the axial movement of the shaft joined thereto.

8. The releasable locking member of claim 7, wherein the conical face and the conical ramped portion are at a similar angle with respect to the longitudinal axis.

9. The releasable locking member of claim 8, wherein the conical ramped portion contacts the conical face when the ball is in the projected position.

10. The releasable locking member of claim 9, wherein axial movement of the shaft against a biasing force of the biasing member moves the land portion of the spindle away from the ball to allow the ball to drop into engagement with the ramped portion of the spindle.

11. The releasable locking member of claim 10, wherein axial movement of the shaft against a biasing force of the biasing member moves the land portion of the spindle away from the ball to allow the ball to drop between the ramped conical portion of the spindle and the conical face of the counterbore.

12. A releasable locking member, comprising:
a handle;
a shank connected at a first end to the handle, wherein the shank has an axial bore extending through the shank along a longitudinal axis thereof to a second end, a lateral opening and a counterbore extending from the second end toward the first end defining a conical face and the lateral openings extending into the counterbore;
a multi-component shaft assembly having a shaft and a separate spindle component, the shaft being disposed in the axial bore of the shank and moveable with respect to the shank along the longitudinal axis, wherein the shaft has a first end portion, a second end portion, and a central portion extending between the first and second end portions, the spindle being a unified component separate from the shaft and which has a proximal end nearer the actuator member and a distal end opposite the proximal end, the spindle further including a bore extending from the proximal end toward the distal end, the bore being shaped to receive the second end portion of the shaft such that the spindle is connected to the second end portion of the shaft, wherein the spindle includes cylindrical land portion and a conical ramped portion angled toward the first end portion of the shaft and the longitudinal axis, the land of the spindle being positioned in the counterbore when in a locked condition;
an actuator member connected to the first end portion of the shaft;
a ball received in the lateral opening in the shank, wherein the land portion of the spindle contacts the ball to place the ball in a projected position where a portion of the ball extends beyond an outer surface of the shank; and
a biasing member positioned between the actuator member and a wall of the handle, wherein the biasing member biases the shaft to move the land portion of the spindle to contact the ball to place the ball in the projected position, and wherein axial movement of the shaft against a biasing force of the biasing member moves the land portion of the spindle away from the ball to allow the ball to drop between the ramped conical portion of the spindle and the conical face of the counterbore.

13. The releasable locking member of claim 12, wherein the cylindrical land portion extends from the distal end to the conical ramped portion and the conical ramped portion extends from the cylindrical land portion to the proximal end.

14. The releasable locking member of claim 13, wherein the lateral opening extends into the counterbore, the region between the counterbore and the narrow section of the axial bore including a conical face, the counterbore being sized to receive the separate spindle and the conical face limiting axial movement of the spindle which thereby limits the axial movement of the shaft joined thereto.

15. The releasable locking member of claim 14, wherein the shaft has a generally constant cross-sectional configuration between the proximal end of the spindle and the actuator member.

16. The releasable locking member of claim 15, wherein the conical face and the conical ramped portion are at a similar angle with respect to the longitudinal axis.

17. The releasable locking member of claim 16, wherein the spindle is disposed in the counterbore.

18. The releasable locking member of claim 17, wherein the counterbore extends past the lateral opening.

19. The releasable locking member of claim 18, wherein the conical ramped portion contacts the conical face when the ball is in the projected position.

20. A releasable locking member, comprising:
a handle;
a shank connected at a first end to the handle, wherein the shank has an axial bore extending through the shank along a longitudinal axis thereof to a second end, a lateral opening and a counterbore extending from the second end toward the first end defining a conical face, the lateral opening being positioned in the counterbore;
a shaft assembly having a shaft and a separate spindle, the shaft being disposed in the axial bore of the shank and moveable with respect to the shank along the longitudinal axis, wherein the shaft has a first end portion, a second end portion, and a central portion extending between the first and second end portions, the spindle being a unified component separate from the shaft and which is connected to the second end portion of the shaft, wherein the spindle includes cylindrical land portion and a conical ramped portion angled toward a proximal end of the spindle and the longitudinal axis, wherein the cylindrical land portion extends from a distal end to the conical ramped portion and the conical ramped portion extends from the cylindrical land portion to the proximal end, the spindle further includes a bore extending from the proximal end toward the distal end, the second end portion of the shaft being received in the bore to join the spindle to the shaft, the conical face and the conical ramped portion are at a similar angle with respect to the longitudinal axis;
an actuator member connected to the first end portion of the shaft;
a ball received in the lateral opening in the shank, wherein the cylindrical land portion of the spindle contacts the ball to place the ball in a projected position where a portion of the ball extends beyond an outer surface of the shank, wherein the conical ramped portion contacts the conical face when the ball is in the projected position; and
a biasing member positioned between the actuator member and a wall of the handle, wherein the biasing member biases the shaft to move the land portion of the spindle to contact the ball to place the ball in the projected position, and wherein axial movement of the shaft against a biasing force of the biasing member moves the land portion of the spindle away from the ball to allow the ball to drop between the ramped conical portion of the spindle and the conical face of the counterbore.

21. The releasable locking member of claim 1, wherein the spindle is formed from a first material and the shaft is formed from a second material.

22. The releasable locking member of claim 1, wherein a substantial portion of the shaft has a generally uniform cross-sectional configuration.

23. The releasable locking member of claim 1, wherein the spindle is joined to the shaft via at least one of a friction fit and a press fit.

24. A releasable locking member, comprising:
a handle;
a shank connected at a first end to the handle, wherein the shank has an axially extending bore extending along a longitudinal axis thereof and a lateral opening;
a multi-component shaft assembly having a shaft and a separate spindle component, the shaft extending through the bore of the shank, wherein the shaft has a first end portion, a second end portion, and a central portion extending between the first and second end portions, the spindle having a proximal end facing the shaft and a distal end opposite the proximal end, the spindle further including a bore extending from the proximal end toward the distal end, the bore being shaped to receive the second end portion of the shaft to connect the spindle to the second end portion of the shaft such that the spindle and the shaft and actuator move in unison as an actuator assembly between the locked and unlocked conditions and for the multi-component shaft assembly, the spindle further including a land portion and a ramped portion, wherein the ramp portion and the land portion of the spindle contact the ball to place and hold the ball in the projected position when the actuator assembly is urged to the locked condition;

an actuator member connected to the first end portion of the shaft such that the actuator and the shaft move together, the actuator and shaft being axially moveable within the bore between a locked condition and an unlocked condition;

a ball received in the lateral opening in the shank and being movable relative to the shank and laterally to the longitudinal axis between a projected position such that the ball projects beyond an outer surface of the shank and a retracted position; and a biasing member engaging the actuator assembly to urge the actuator assembly to the locked condition.

25. The releasable locking member of claim 1, wherein the bore in the spindle is a blind hole.

\* \* \* \* \*